United States Patent [19]

Machen

[11] Patent Number: 5,265,686
[45] Date of Patent: Nov. 30, 1993

[54] REMOTE CONTROLLED STEERING MECHANISM

[75] Inventor: Edmund H. Machen, Charlotte, N.C.

[73] Assignee: Machen Designs, Inc., Charlotte, N.C.

[21] Appl. No.: 753,041

[22] Filed: Aug. 30, 1991

[51] Int. Cl.$^5$ .............................................. B60K 27/06
[52] U.S. Cl. .................................... 180/169; 180/211; 180/79.1; 280/92; 280/DIG. 5
[58] Field of Search ............... 180/167, 169, 79.1, 180/79, 211, 213, 215; 280/DIG. 5, 62, 156, 152.1, 92

[56] References Cited

U.S. PATENT DOCUMENTS

| | | | |
|---|---|---|---|
| 2,021,706 | 11/1935 | Twyman | 180/79.1 |
| 3,472,333 | 10/1969 | Loewenstein | 280/DIG. 5 |
| 3,473,623 | 10/1969 | Meek | 180/79.1 |
| 3,742,507 | 6/1973 | Pirre | 180/79.1 |
| 3,800,902 | 4/1974 | Keller | 180/79.1 |
| 4,844,493 | 7/1989 | Kramer | 280/DIG. 5 |

FOREIGN PATENT DOCUMENTS 168218  9/1921  United Kingdom ............ 280/152.1

Primary Examiner—David M. Mitchell
Attorney, Agent, or Firm—Saidman DesignLaw Group

[57] ABSTRACT

A steering mechanism for a remotely-controlled golf caddie having a drive motor coupled to a steering assembly by a non-positive coupling. The non-positive coupling between the drive motor and the steering assembly allows the steering assembly to disengage from the drive motor when the caddie runs into an obstruction. Also, the steering mechanism uses a potentiometer assembly for allowing the caddie to center itself after receiving a command to turn left or right.

9 Claims, 4 Drawing Sheets

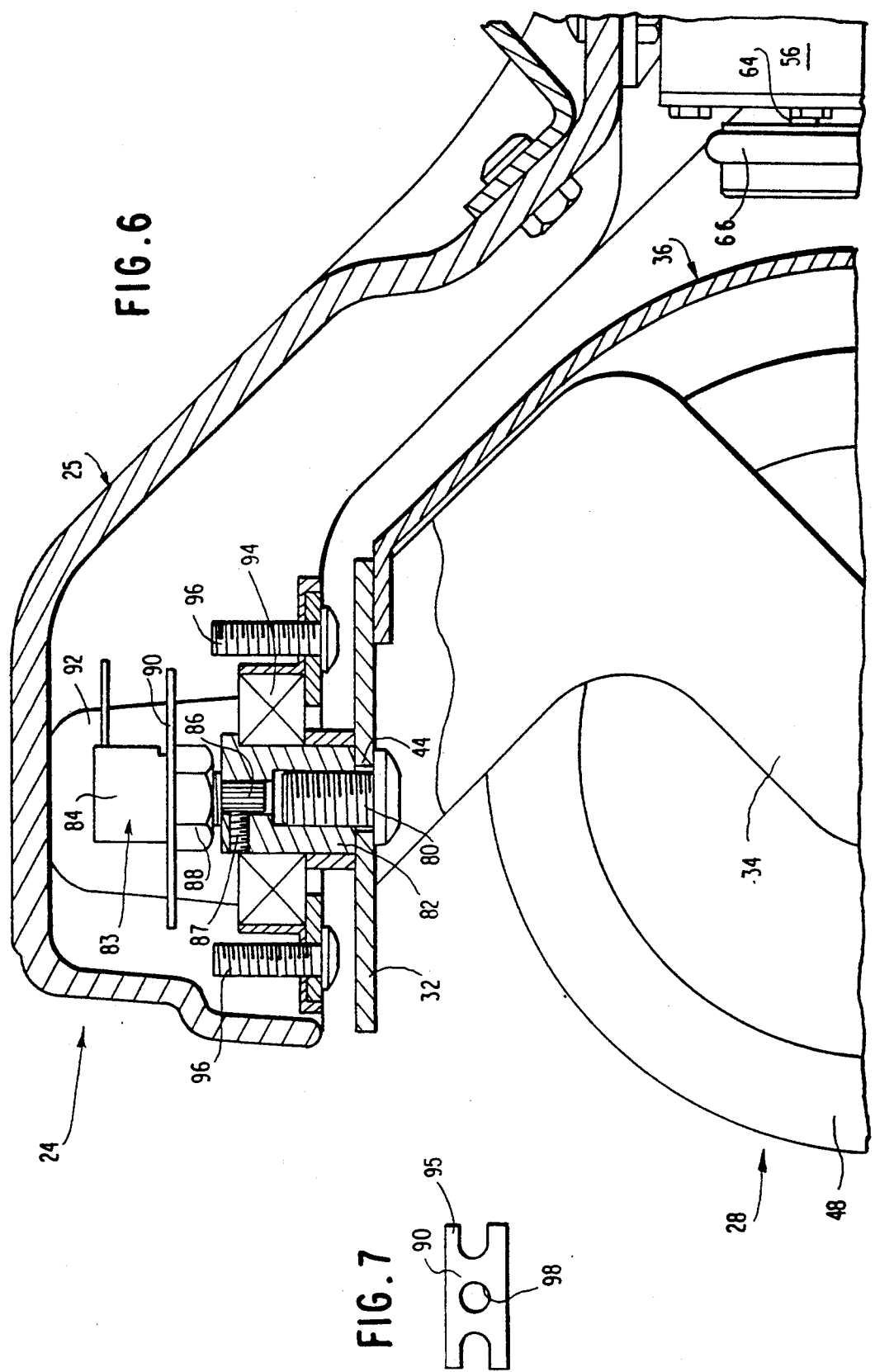

REMOTE CONTROLLED STEERING MECHANISM

BACKGROUND OF THE INVENTION

1. Field of the Invention

This invention relates to remote controlled golf caddies and, more particularly, is directed to a steering mechanism for such remote controlled golf caddies.

2. Description of Related Art

One method of carrying golf clubs over the fairways of a golf course has been through the use of a motorized golf caddie. While there exists a variety of types of motorized caddies, including some which the golfer may ride on, those motorized golf caddies which are directed by a remote control have recently been popular. Such remote controlled golf caddies allow the golfer to reap the exercise benefits of walking the golf course without having to carry a heavy bag of golf clubs or worry about manually directing the caddie.

Generally, the remote controlled golf caddies of the type described are directed by means of radio signals sent by the user of the remote control to the caddie. These signals are processed and instruct the caddie to stop or move forward, left or right as desired.

For steering the caddie in a left or right direction, the caddie is equipped with a receiver to process the left and right directional signals sent by the remote control. These signals are transmitted to a steering mechanism which includes a drive motor positively coupled through interlocking gears or linkage to a steering assembly having a steering wheel. The drive motor, depending on the signal received from the remote control, will turn the gears in either a left or right direction. The gears will then turn the steering assembly accordingly.

A major difficulty with the steering mechanisms of the type discussed above is that by positively coupling the motor to the steering wheel assembly, the steering wheel assembly cannot become disengaged from the motor. Thus, when the caddie runs into an obstruction, such as a pothole, a shock is sent through the steering assembly and the gear coupling back to the motor. Indeed, such a shock may reverse the direction of the motor. This can cause great damage to the gears which couple the drive motor and steering assembly, as well as to the drive motor itself. Once the gears and motor have been damaged, the caddie is useless until repairs can be made by a repair shop. These repairs can be very expensive.

Also, remote controlled steering mechanisms of the type described generally will continue to turn in the direction dictated by the user of the remote control until another signal is sent which turns the golf caddie back to a straight course. For example, at the end of a left turn, the user would have to turn the mechanism right until the caddie was brought back to a centered position. Sometimes, continual switching between left and right is required before the caddie is exactly straightened, causing frustration to the golfer operating the remote control.

OBJECTS AND SUMMARY OF THE INVENTION

It is therefore a primary object of the present invention to provide a steering mechanism for a remote controlled golf caddie which is not easily damaged when the golf caddie runs into an obstruction.

Another object of the present invention is to provide a steering mechanism for a remote controlled golf caddie which is easily repaired.

A still further object of the present invention is to provide a steering mechanism for a remote controlled golf caddie in which the direction of the golf caddie is easy to control.

The foregoing and other objects are achieved in accordance with one aspect of the present invention through a steering mechanism for a remotely-controlled motorized golf caddie comprising a steering wheel assembly, a motor for turning the steering wheel assembly and means for non-positively coupling the motor to the steering wheel assembly.

In accordance with another aspect of the present invention, the steering wheel assembly comprises a steering wheel and a fender assembly connected to the steering wheel. The fender assembly comprises a yoke connected to the steering wheel, a plate located at the top of the yoke and above the steering wheel, and a fender connected to the plate. The fender comprises a substantially stiff material having a first portion extending rearwardly and downwardly from the plate and behind the steering wheel, and a second portion forming a platform extending laterally from the first portion. The platform forms a curved track adapted to be rotated for steering the golf caddie.

In accordance with still another aspect of the present invention, the steering mechanism comprises a drive wheel connected to the motor, the motor being capable of rotating the drive wheel in either of two directions. The means for non-positively coupling the motor to the steering wheel assembly comprises the placement of the drive of the drive wheel on the platform.

In accordance with yet another aspect of the present invention, the steering mechanism comprises housing means for supporting the motor and the steering wheel assembly. Also, the steering mechanism comprises means for permitting the drive wheel to slip along or disengage from the platform when the steering wheel encounters an obstacle. The means for permitting the drive wheel to slip along or disengage from the platform comprises a spring having a first end and a second end. The first end of the spring is connected to the motor and the second end of the spring is connected to the housing means.

In accordance with yet another aspect of the present invention, there is provided a steering mechanism for a remotely controlled golf caddie which comprises a steering wheel assembly, housing means for supporting the steering wheel assembly, and potentiometer means mounted in the housing means for self-centering the steering wheel assembly. The steering mechanism further comprises means for coupling the steering wheel assembly to the potentiometer means for permitting the potentiometer means to detect rotation of the steering wheel assembly. The potentiometer means comprises a potentiometer body and a rotatable potentiometer shaft extending from the potentiometer body. The rotatable potentiometer shaft fits with the coupling means so that the potentiometer shaft turns with the steering assembly.

In accordance with still another aspect of the invention, the means for coupling the steering wheel assembly to the potentiometer means comprises a bearing shaft having first and second ends and a screw extending through the steering assembly and into the first end of the bearing shaft, the rotatable potentiometer shaft fitting into the second end of the bearing shaft. There are means in the housing means for preventing rotation of the potentiometer body when the steering assembly and the potentiometer shaft turn. The means for preventing rotation of the potentiometer body comprises clip means for removably mounting the potentiometer body in a fixed position in the housing. Electronic circuit means return the potentiometer shaft to the fixed position of the potentiometer body.

In accordance with another aspect of the present invention, there is provided a steering mechanism comprising a steering assembly, motor means for turning the steering assembly in a left or right direction, a housing having a forward portion and a rearward portion, and means for self-centering the steering assembly. The means for self-centering the steering assembly are located in the forward portion of the housing, and the motor means for turning the steering assembly are located in the rearward portion of the housing.

BRIEF DESCRIPTION OF THE DRAWINGS

Further aspects, features and advantages of the present invention will be more readily apparent as the same becomes understood when considered in conjunction with the following detailed description of the present invention viewed in conjunction with the accompanying drawings, in which:

FIG. 6 is an enlarged cross sectional view of the potentiometer means of the present invention;

FIG. 7 is a top, plan view of the potentiometer mounting means of the present invention.

DETAILED DESCRIPTION OF A PREFERRED EMBODIMENT

Figure 1:
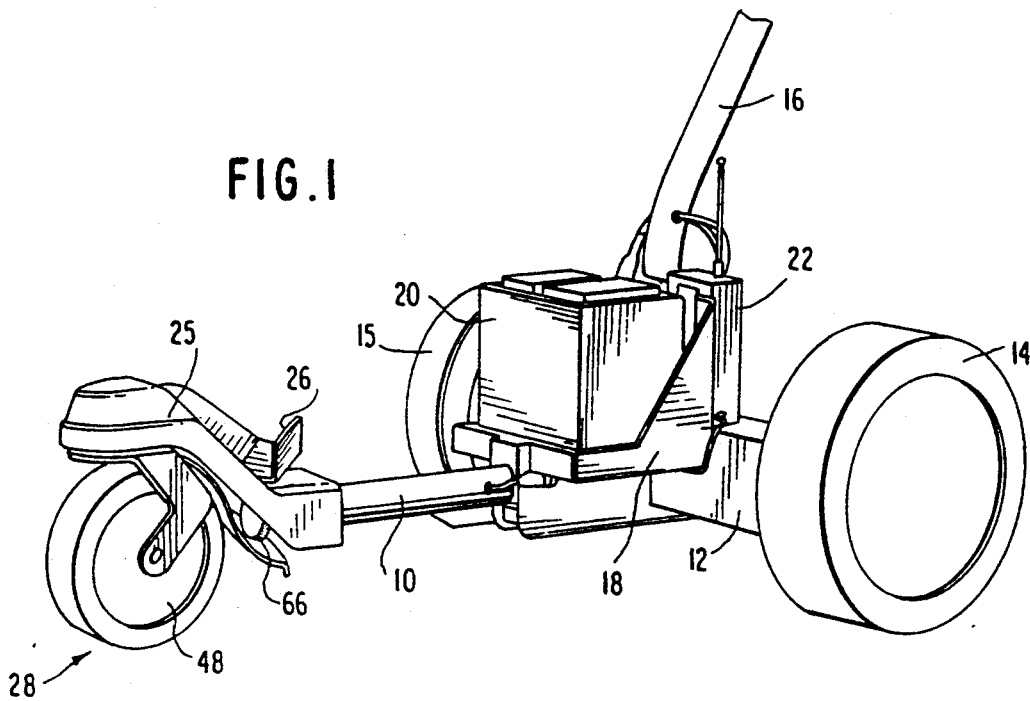
FIG. 1 is a perspective view showing a motorized golf caddie having a preferred embodiment of the present invention.

Referring now to the drawings, there is illustrated in FIG. 1 a perspective view of a remote controlled motorized golf caddie constructed in accordance with a preferred embodiment of the present invention.

As shown in FIG. 1, the remote controlled golf caddie comprises a substantially long and narrow frame 10 and a rear axis 12 perpendicularly connected to the rear of frame 10. On each end of rear axis 12 are rear wheels 14 and 15 which drive the caddie forwards. Extending upward from rear axis 12 and angling away therefrom is a handle 16 for pushing the golf caddie when it is not powered by a motor. Connected to the rearward portion of frame 10 and just below the handle 16 is a battery holder 18 comprising a tray-like structure. Placed in the battery holder 18 is a battery 20. Rearward of battery holder 18 on axis 12, and next to the handle 16, is a radio receiver 22 for receiving signals sent by a remote control.

Extending forwardly of frame 10 is a steering housing 25. Steering housing 25 extends outward and upward from frame 10. Located below the forward portion of steering housing 25 is a front wheel assembly 28. Attached to the rearward portion of steering housing 25 is a bag holder 26 in which the lower portion of a golf club bag is placed.

Figure 2:
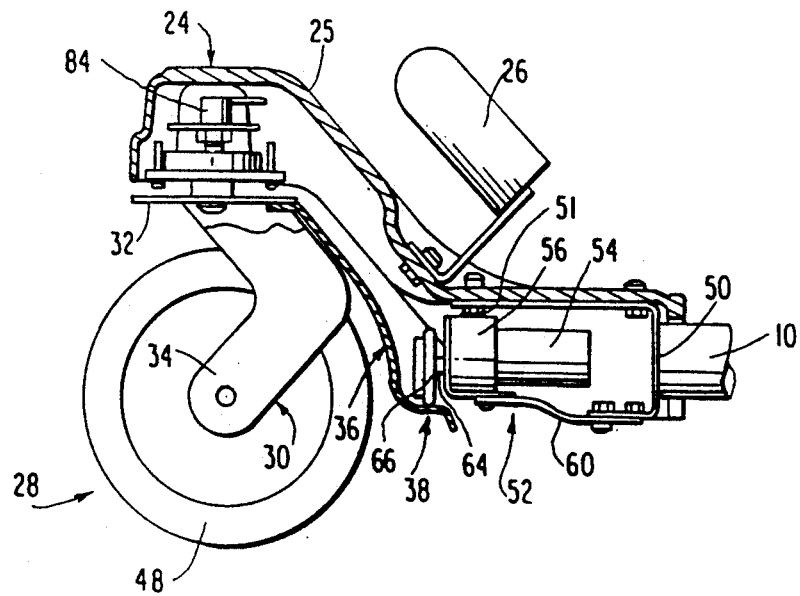
FIG. 2 is a cross sectional view showing the preferred embodiment of the present invention.

Referring now to FIG. 2, there is illustrated a cross-sectional view through steering housing 25. It is seen to house a motor assembly 52 located rearwardly of front wheel assembly 28 and potentiometer assembly 24 located above steering wheel assembly 28, all of which are to be described in greater detail hereafter.

Figure 3:
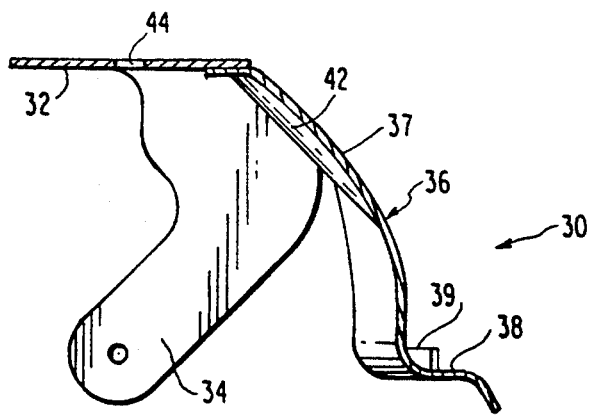
FIG. 3 is a sectional view of the yoke and fender portion of the preferred embodiment of the present invention.
Figure 4:
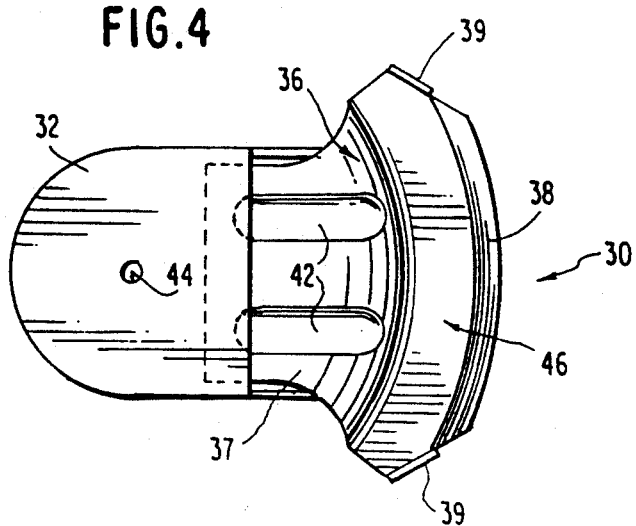
FIG. 4 is a top plan view of the portion shown in FIG. 3.

Steering wheel assembly 28 comprises a steering wheel 48 connected to a fender assembly 30, the latter being shown in more detail in FIGS. 3 and 4. Fender assembly 30 comprises a yoke 34 which straddles both sides of front wheel 48 and is attached through the center thereof. Located at the top of yoke 34 is a substantially flat plate 32 which is curved at its front end. Plate 32 and yoke 34 actually form one piece. Plate 32 contains a hole 44 through which a screw is inserted for attaching fender assembly 30 to the potentiometer assembly 24, as will be described in greater detail below.

Welded to the rear portion of plate 32 and extending rearwardly and downwardly from yoke 34 is a fender 36 made from a substantially stiff material such as stainless steel. The bottom part of fender 36 forms a platform 38 which extends laterally from a rear portion 37 of fender 36. Thus, rear portion 37 and platform 38 form an L-configuration. Rear portion 37 also contains stiffening ribs 42 which appear as indentations in fender 36 as shown in FIG. 4. A small tab 39 extends upwardly from each end of platform 38. Situated on platform 38 is an arcuate track 46.

Figure 5:
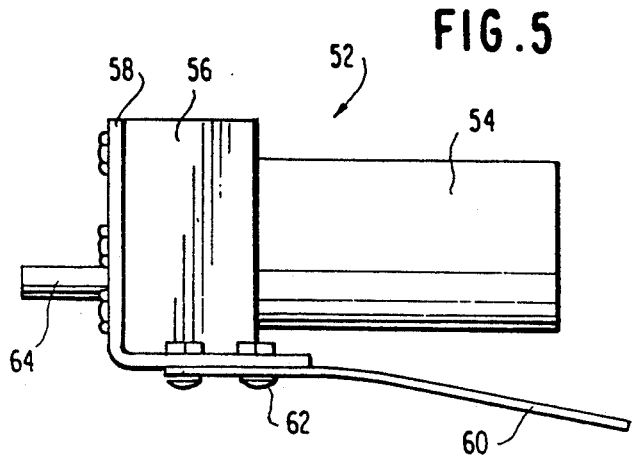
FIG. 5 is a side view of the motor spring assembly of the preferred embodiment of the present invention.

Referring now to FIG. 5, motor assembly 52 comprises a motor 54 connected to a gear box 56 located in front of motor 54. Attached to the front of gear box 56 is a motor mount 58 through the front of which extends a turning shaft 64. Located below motor assembly 52 and extending from motor mount 58 downwardly and rearwardly is a spring 60 which is connected to motor mount 58 by means of a rivet 62. As seen in FIG. 2, the other end of spring 60 is connected to a mounting box 50 located forwardly of frame 10. The top of mounting box 50 is attached directly to housing 25 as at 51.

Still referring to FIG. 2, attached to the end of turning shaft 64 is a drive wheel 66 which is preferably made of rubber. When assembled, drive wheel 66 sits on platform 38 of fender 36. The amount of force created by drive wheel 66 against platform 38 is determined by spring 60 used to mount motor assembly 52 to mounting box 50. By placing drive wheel 66 on platform 38, motor assembly 52 is coupled to steering assembly 28. Also, since drive wheel 66 is merely placed on platform 38, drive wheel 66 may easily slip along or become disengaged from platform 38 when, for example, the caddie engages an obstacle such as a pothole, curb or tree. Such a coupling is referred to in this application as a "non-positive" coupling. The ease with which drive wheel 66 will disengage from platform 38 depends in part on the amount of force created by spring 60 in forcing drive wheel 66 against platform 38.

Located above steering wheel assembly 28 is potentiometer assembly 24. Referring to FIG. 6, potentiometer assembly 24 comprises a potentiometer 83 having a potentiometer body 84 which has a rotatable shaft 86 extending downwardly therefrom. Potentiometer body 84 is fixed in place by means of a clip 90 which engages opposed, U-shaped walls 92 formed in housing 25. As shown in FIG. 7, clip 90 contains arms 94 which fit around walls 92. There is a hole 98 in clip 90 through which rotatable potentiometer shaft 86 extends. Clip 90 is further held in place by means of a lock nut 88.

Rotatable potentiometer shaft 86 is removably fitted in the top of a rotatable bearing shaft 82 which is surrounded by ball bearings 94. Rotatable potentiometer shaft 86 is secured to rotatable bearing shaft 82 by a set screw 87. A screw 80 extends through plate 32 of steering assembly 28 and screws into the bottom of rotatable bearing shaft 82. Thus, potentiometer 83 is connected to steering assembly 28. Moreover, as steering assembly 28 turns, so will rotatable bearing shaft 82 and rotatable potentiometer shaft 86 fitted therein. Potentiometer assembly 24 is secured to housing 25 by means of screws 96.

Referring back to FIG. 2, the steering mechanism of the present invention operates in response to electronic signals, described in more detail below, which control motor assembly 52. In accordance with such electronic signals, drive wheel 66 is turned in a left or right direction along track 46 of platform 38. Tabs 39 on platform 38 limit the movement of drive wheel 66 by intercepting motor mount 58. When drive wheel 66 is turned in a left or right direction, fender 36 is turned by means of the friction created by drive wheel 66 against platform 38. The movement of fender 36 causes plate 32 and yoke 34 to move in the same direction, which then causes front wheel 48 to turn in the desired direction.

Since steering wheel assembly 28 is connected to potentiometer assembly 24, rotatable bearing shaft 82 will turn as wheel assembly 28 turns. This causes potentiometer shaft 86 to turn as well. Once potentiometer shaft 86 becomes out of line with the fixed position of potentiometer body 84, electronic signals, described in more detail below, turn wheel assembly 28 to a centered position.

Figure 8:
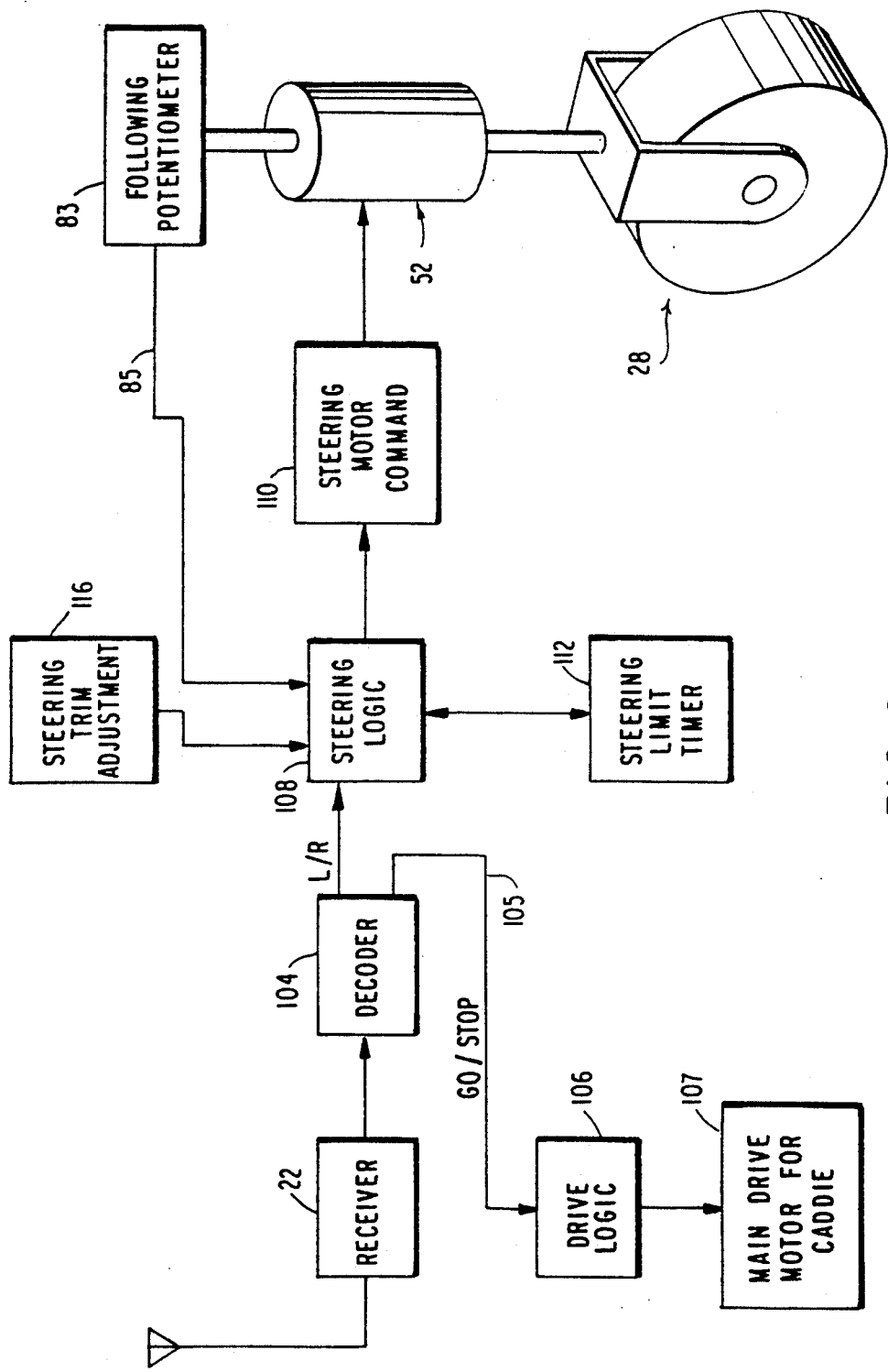
FIG. 8 is a block diagram of the electronic control circuit of the preferred embodiment of the present invention.

Referring now to FIG. 8, there is shown a block diagram of the electronic circuitry which processes the signals relayed by the remote control. A signal from the remote control is received by a receiver 22 placed on the golf caddie. The signal is then sent to a decoder 104 which determines whether the signal means the golf caddie should stop, start, turn left or turn right. If the signal is for the golf caddie to start or stop, the signal is sent via line 105 to drive logic 106 which instructs a main drive motor for the caddie 107 to turn rear wheels 14 and 15, or to stop turning wheels 14 and 15, depending on the command.

Should receiver 22 receive a signal that the caddie should turn left or right, the signal is sent from decoder 104 to steering logic 108. Steering logic 108 then forwards the turn signal to a steering motor command 110 which instructs motor assembly 52 to turn drive wheel 66 in the correct direction. This will, in turn, cause steering assembly 28 to turn accordingly. Should a signal to turn the caddie right be received, for example, steering logic 108 will forward an appropriate electronic signal to steering motor command 110 which will instruct motor assembly 52 to turn drive wheel 66 to the right along track 46 until it can go no further. As long as the caddie continues to receive a turn right signal, drive wheel 66 will remain at its farthest possible position to the right on track 46, and motor assembly 52 will be instructed to shut off.

Once the signal to turn right ceases (i.e., stops being applied by the user of the remote control), an error signal will be sent by potentiometer 83 over line 85 back to steering logic 108 that essentially says that steering assembly 28 is no longer centered. In other words, potentiometer 83 tracks the turning of steering assembly 28 and compares the position of steering assembly 28 to the centered or "null" position. After receiving the error signal from potentiometer 83, steering logic 108 sends a signal to steering motor command 110 that motor assembly 52 should turn drive wheel 66 back in the other direction until the caddie is centered. Once centered, motor assembly 52 will shut off until such time that another directional signal is received.

The circuitry may also contain a steering limit timer 112. Steering limit timer 112 is included so that if a command is received which cannot be satisfied, motor assembly 52 is shut off. For example, if drive wheel 66 has disengaged from platform 38, motor assembly 52 would shut off. This would occur after a pre-determined time, preferably consisting of a few seconds.

The circuitry may also contain a steering trim adjustment 116. Steering trim adjustment 116 is essentially an electronic potentiometer paralleling the mechanical potentiometer 83 described herein so that whatever linearity errors exist in whatever part of the circuit, it is trimmed up so that the wheel goes in a straight line in the absence of a signal. A second mechanical potentiometer could also be used here, however, it was determined that performing this function electronically was easier.

As previously discussed, in the preferred embodiment the motor assembly 52 is mounted to the caddie by means of a spring 60. Should the caddie encounter a particularly rough surface, or an obstruction such as a pothole, spring 60 will, by means of motor assembly 52, cause drive wheel 66 to disengage from platform 38, usually by slipping on track 46. Drive wheel 66 will disengage from platform 38 because of the non-positive coupling between steering assembly 28 and motor assembly 52. Once drive wheel 66 has disengaged from its position on platform 38, potentiometer 83 will cause motor 50 to turn drive wheel 66 to a position which will center steering assembly 28.

The advantage of the non-positive coupling which allows drive wheel 66 to disengage from platform 38 is that little or no damage is caused to motor assembly 52 as the shock from hitting an obstruction, such as a curb or tree, moves back through the caddie. Moreover, even if damage is caused to the caddie, the caddie is easily repaired due to the simplicity of the parts used in the caddie and the ease in assembling and dissembling the caddie.

Obviously, numerous modifications and variations of the present invention are possible in light of the above teachings. It is therefore to be understood that within the scope of the appended claims, the invention may be practiced otherwise than as specifically described herein.

I claim as my invention:

1. A steering mechanism for a remotely-controlled motorized golf caddie, comprising:
   a yoke assembly rotatably mounted on said caddie about a first axis;
   a ground contacting steering wheel rotatably journaled on said yoke assembly to rotate about a second axis perpendicular to said first axis;

a fender fixedly mounted to said yoke assembly to rotate therewith about said first axis; and a motor including a drive wheel;

means mounting said motor on said caddie to bias said drive wheel into operative engagement with said fender, said motor being responsive to remotely-controlled electrical signals to rotate said fender, and thereby said yoke and said steering wheel, in either of two directions to steer said caddie, said mounting means enabling said drive wheel to be operatively disengaged from said fender when said steering wheel encounters an obstacle.

2. The steering mechanism of claim 1, wherein:

said fender comprises a plate fixed to said yoke, a first portion extending rearwardly and downwardly from said plate and behind said steering wheel, and a second portion forming a platform which extends laterally from said first portion, said driving wheel being operatively engaged with said platform.

3. The steering mechanism of claim 2, wherein:

said mounting means comprises a spring which biases said drive wheel into frictional engagement with said platform.

4. The steering mechanism of claim 3, wherein:

said spring is a leaf spring.

5. A steering mechanism for a remotely-controlled motorized golf caddie, comprising a steering wheel assembly, a motor for turning said steering wheel assembly, and means for non-positively coupling said motor to said steering wheel assembly; wherein said steering wheel assembly comprises a steering wheel and a fender assembly connected to said steering wheel; wherein said fender assembly comprises a yoke connected to said steering wheel, a plate located at the top of said yoke and above said steering wheel, and a fender connected to said plate; wherein said fender comprises a substantially stiff material having a first portion extending rearwardly and downwardly from said plate and behind said steering wheel, and a second portion forming a platform which extends laterally from said first portion; wherein said platform forms a curved track adapted to be rotated by said motor for steering said golf caddie; further comprising a drive wheel connected to said motor, said drive wheel being operatively connected to said curved track for turning said steering wheel assembly, said motor being capable of rotating said drive wheel in either of two directions.

6. The steering mechanism of claim 5, further comprising housing means for supporting said motor and said steering wheel assembly.

7. The steering mechanism of claim 6, further comprising means for permitting said drive wheel to slip along said platform.

8. The steering mechanism of claim 6, wherein said means for permitting said drive wheel to slip along said platform comprises a spring, said spring having a first end and a second end.

9. The steering mechanism of claim 7, wherein said first end of said spring is connected to said motor and said second end of said spring is connected to said housing means.

* * * * *